(12) United States Patent
Heinloth et al.

(10) Patent No.: US 8,858,132 B2
(45) Date of Patent: Oct. 14, 2014

(54) CUTTING INSERT

(75) Inventors: Markus Heinloth, Postbauer-Heng (DE); Jürgen Zastrozynski, Düsseldorf (DE)

(73) Assignee: Kennametal Inc., Latrobe, PA (US)

( * ) Notice: Subject to any disclaimer, the term of this patent is extended or adjusted under 35 U.S.C. 154(b) by 458 days.

(21) Appl. No.: 11/989,644

(22) PCT Filed: Jul. 14, 2006

(86) PCT No.: PCT/DE2006/001222
§ 371 (c)(1),
(2), (4) Date: Jan. 29, 2008

(87) PCT Pub. No.: WO2007/016890
PCT Pub. Date: Feb. 15, 2007

(65) Prior Publication Data
US 2009/0232609 A1 Sep. 17, 2009

(30) Foreign Application Priority Data
Aug. 8, 2005 (DE) .................... 20 2005 012 615 U

(51) Int. Cl.
*B26D 5/14* (2006.01)
*B23P 15/34* (2006.01)
*B23C 5/20* (2006.01)
*B23C 3/06* (2006.01)

(52) U.S. Cl.
CPC ........... *B23C 5/207* (2013.01); *B23C 2200/085* (2013.01); *B23B 2200/3663* (2013.01); *B23C 3/06* (2013.01); *B23C 2200/286* (2013.01); *B23C 2215/20* (2013.01); *B23C 2200/203* (2013.01)
USPC ......................................... 407/115; 407/116

(58) Field of Classification Search
USPC .................................. 407/113, 114, 115, 116
See application file for complete search history.

(56) References Cited

U.S. PATENT DOCUMENTS 4,130,371 A * 12/1978 Druxeis ......................... 407/114
4,433,948 A *  2/1984 Kodama ......................... 407/42
(Continued)

FOREIGN PATENT DOCUMENTS

DE           1 816 409          6/1970
DE         19520058 A1         12/1996
(Continued)

OTHER PUBLICATIONS

Translation of JP 2001-219313 A.*
(Continued)

*Primary Examiner* — Boyer D Ashley
*Assistant Examiner* — Jennifer Swinney
(74) *Attorney, Agent, or Firm* — Larry R. Meenan, Esq.

(57) ABSTRACT

The invention relates to a cutting insert, in particular for machining crankshafts, having two base surfaces (10, 11) which are arranged parallel to one another and through which a respective hole (12) passes for receiving a clamping screw and which merge at their shorter edges into rounded end faces which are each defined laterally by cutting edges. According to the invention, at least one pair of the cutting edges is of stepped design and has two convex sections (13, 14) and a concave section (15) lying in between, wherein the outer convex section (13) extends over an angle of 180°.

13 Claims, 3 Drawing Sheets

(56) References Cited

U.S. PATENT DOCUMENTS

| | | | |
|---|---|---|---|
| 4,790,698 A | 12/1988 | Heffron | |
| 5,209,611 A * | 5/1993 | Drescher | 407/48 |
| 5,833,410 A | 11/1998 | Lim | |
| 5,947,650 A * | 9/1999 | Satran et al. | 407/113 |
| 6,050,757 A | 4/2000 | Gesell | |
| 6,273,651 B1 * | 8/2001 | Heinloth et al. | 407/116 |
| 6,374,472 B1 | 4/2002 | Ramold et al. | |
| 6,733,212 B2 * | 5/2004 | Nagaya et al. | 407/34 |
| 6,805,520 B2 | 10/2004 | Gesell et al. | |
| 6,939,091 B2 * | 9/2005 | Wermeister | 407/113 |
| 7,097,393 B2 * | 8/2006 | Satran et al. | 407/113 |
| 7,175,370 B2 * | 2/2007 | Scherbarth | 407/113 |
| 7,275,895 B2 | 10/2007 | Heinloth | |
| 2006/0002779 A1 | 1/2006 | Bauer et al. | |

FOREIGN PATENT DOCUMENTS

| | | | | |
|---|---|---|---|---|
| DE | 10333621 A1 * | 2/2005 | | B23C 5/20 |
| EP | 0 286 771 | 10/1988 | | |
| EP | 0 542 026 A1 | 5/1993 | | |
| JP | 62039106 A | 2/1987 | | |
| JP | 02053502 A | 2/1990 | | |
| JP | 05 050315 A | 3/1993 | | |
| JP | 08108310 A | 4/1996 | | |
| JP | 09309019 A | 12/1997 | | |
| JP | 10100010 A | 4/1998 | | |
| JP | 11197935 A | 7/1999 | | |
| JP | 2000126922 A | 5/2000 | | |
| JP | 2000354905 A | 12/2000 | | |
| JP | 2001219313 | * | 8/2001 | |
| JP | 2004 230525 A | 8/2004 | | |
| JP | 2005081469 A | 3/2005 | | |
| JP | 2005103733 A | 4/2005 | | |
| WO | 96/39269 A1 | 12/1996 | | |
| WO | 97/21513 A2 | 6/1997 | | |
| WO | 01/94065 A1 | 12/2001 | | |
| WO | 2004/020133 A1 | 3/2004 | | |
| WO | 2005005084 A1 | 1/2005 | | |

OTHER PUBLICATIONS

Apr. 23, 2014—KW-2336-2DECN2-10A.

* cited by examiner

SECTION C-C

CUTTING INSERT

CROSS REFERENCE TO RELATED APPLICATIONS

This application is the US national phase of PCT application PCT/DE2006/001222, filed 14 Jul. 2006, published 15 Feb. 2007 as WO 2007/016890, and claiming the priority of German patent application 202005012615.2 itself filed 8 Aug. 2005, whose entire disclosures are herewith incorporated by reference.

FIELD OF THE INVENTION

The invention relates to a cutting insert, in particular for crankshaft machining, with two planar end faces parallel to each other and each traversed by a bore for receiving a mounting bolt and both of which merge on their short side edges into rounded edge faces that are each bounded at the side by cutting edges.

BACKGROUND OF THE INVENTION

Such cutting inserts are used for example in the external milling of crankshafts, in particular for the machining of the undercut on the crank pin. In EP 0 830 228 [U.S. Pat. No. 6,374,472], an external milling disk is described that is driven in such a way that machining is done at cutting speeds of over 160 m/min. In doing so, both the crankshaft and the external milling disk are rotated. Tangentially clamped cutting inserts are used for the machining of the cylindrical surfaces of the rotated workpiece, for example the crankpin surface, while radially clamped cutting inserts are used for the machining of the cheeks, an oil flange and an undercut. Such cutting inserts have the structure described above, each with rounded cutting edges that have an at least essentially uniform curvature about an angle of approximately 135° and that merge here immediately to a straight segment, before the cutting edge merges via a convex curvature into the opposite end face.

For the machining of crankshafts, turning tools are known in the prior art that are used in the so-called turn-broach or turn-turn-broach method. In turn broaching, a straight turn broach tool is advanced radially onto the rotating workpiece to be machined. In turn-turn broaching, multiple cutting inserts in series are positioned around a reference circumference of a disk-shaped tool carrier and are gradually steadily indexed along an initial section of the disk circumference. This tool is pivoted inward along a reference arc in the radial direction onto the rotated tool, as described in principle in EP 0 313 644 [U.S. Pat. No. 4,790,698] or EP 0 286 771. On these bar- or disk-shaped tools as well, two geometrically different types of cutting inserts are used for the pin machining and the formation of the undercut.

Beside the methods described above, so-called internal milling is also known in the prior art, in which the work is likewise done using a disk-shaped milling tool, but with the proviso that the cutting inserts are positioned on the inner periphery of an annular disk.

The tool costs are comprised of multiple components. These include in particular those tool costs that are determined not only by the pure manufacturing costs, but also by the tool life. In addition, machining times and the costs of tool replacement are also included. So-called indexable inserts have multiple usable cutting blades, although the number of them is limited by the design. For instance, the number of usable cutting edges in a cutting insert mentioned at the start is limited to four.

OBJECT OF THE INVENTION

The object of the present invention is to design this cutting insert further in such a way that its cutting edge shape enables expanded machining possibilities.

SUMMARY OF THE INVENTION

This object is attained by a cutting insert according to the invention in that at least some of the cutting edges are formed with steps and have two convex sections and one concave section between them, with the outer convex sections extending over an angle of 180°.

Using such a cutting edge shape, steps such as an oil flange of a crankshaft can be cut, while at the same time a cheek, the oil flange and also the pin bearing corner or an undercut can be shaped.

Thus preferably two respective pairs of stepped cutting edges are provided, so that the cutting insert is rotationally symmetrical about a perpendicular axis when rotated through 180°. This results in a total of four congruent cutting edges that can be used one after another.

For cutting-edge stabilization, a chamfer is provided along the cutting edge that is preferably positioned with a (negative) chamfer angle of −15° and/or with a chamfer width of 0.1 mm to 0.2 mm.

The rake angle, in particular the rake angle adjacent the chamfer is 0° to 20°, and is preferably +10°.

For better support of the cutting insert in its seat fit, the cutting insert has planar side faces in a middle area perpendicular to the planar end faces.

As already mentioned above, the radius of curvature of the cutting edge can be selected in such a way that a stepped shape of the desired dimensions is cut in one operation using this cutting edge. In particular for crankshaft machining, the radius of curvature in the concave area of the cutting edge is selected at 1.5±0.1 mm, and in the convex area of the cutting edge at 1.5±0.1 mm on one side and at 1.4±0.1 mm on the other side. However, other cutting-edge radiuses of curvature can also be used according to the invention.

Likewise, a cutting insert design can preferably be selected in which a common tangent on the convex sections forms an angle of 35°±5° with the end faces.

According to a further embodiment of the invention, the cutting edge area extending over 180° merges via a straight cutting edge piece into the adjacent end face, with this cutting edge piece forming an angle of ≤5° with the end face.

Finally, according to a preferred embodiment of the invention, the convex and concave cutting-edge sections are slanted at an angle of up to 20°, preferably 10°, to a longitudinal central axis of the cutting insert.

BRIEF DESCRIPTION OF THE DRAWING

Further embodiments and advantages of the cutting insert are shown in the drawings. Therein.

SPECIFIC DESCRIPTION

The cutting insert shown in the figures has two planar end faces 10 and 11 extending parallel to each other and traversed by a throughgoing bore 12. This bore 12 serves to receive a mounting bolt that secures the cutting insert radially or laterally to a milling disk. The end faces 10 and 11 merge at their short side edges into rounded edge faces that are bounded at their ends by cutting edges. The cutting edges are shaped in steps and each have two convex cutting edge sections 13 and 14 and one concave cutting edge section 15 between them. Radii $R_1$ and $R_3$ for the convex cutting edge sections can be the same, e.g. 1.5 mm, or different. The same also applies to a radius $R_2$ of the concave cutting edge section 15.

Figure 4:
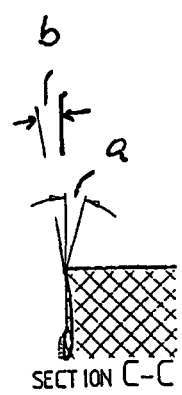
FIG. 4 is a partial section through a cutting edge.
Figure 2:
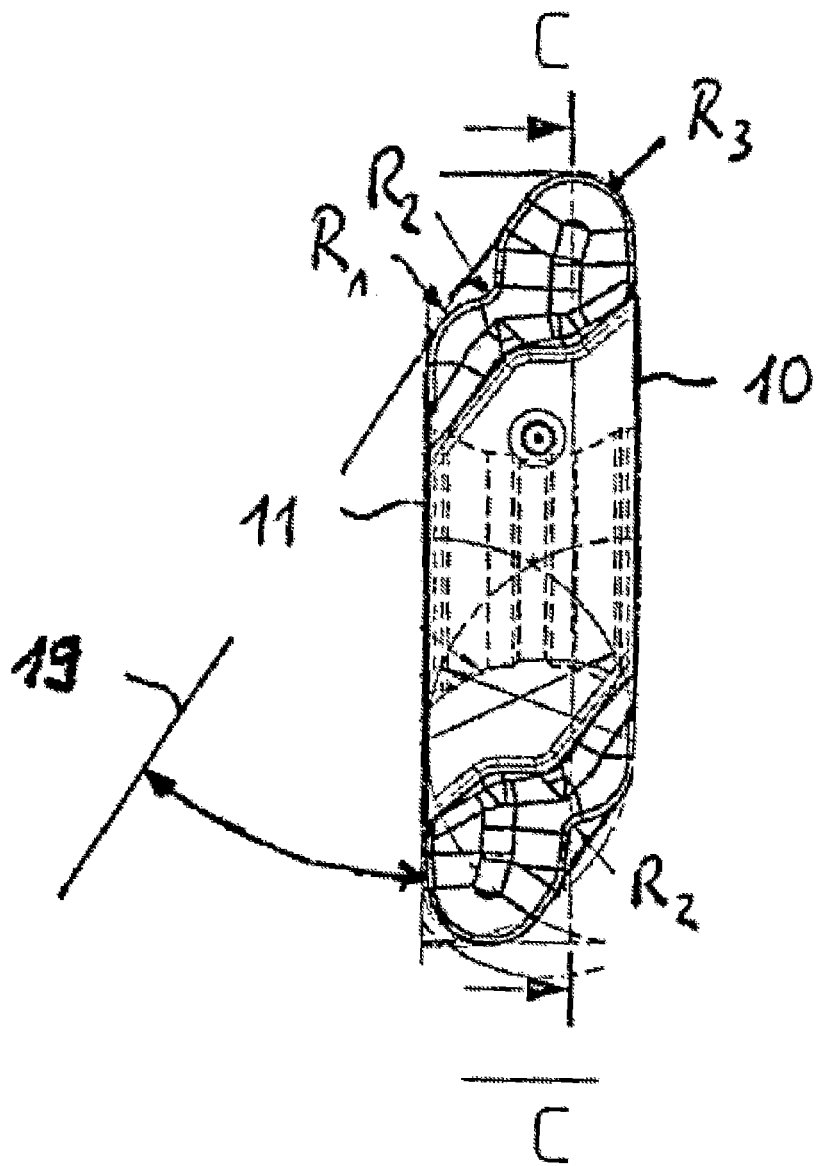
FIG. 2 is a side view (with a top view of the cutting edges)

The cutting insert has a chamfer 16 that extends between the cutting edge sections 13 and 15. This chamfer 16 is set at a chamfer angle a of −15°. A rake angle b also shown in FIG. 4 is +10°. The chamfer width is 0.15 mm, for example.

In the middle, perpendicular to the planar end faces 10 and 11, there are planar side faces 17 and 18.

Figure 3:
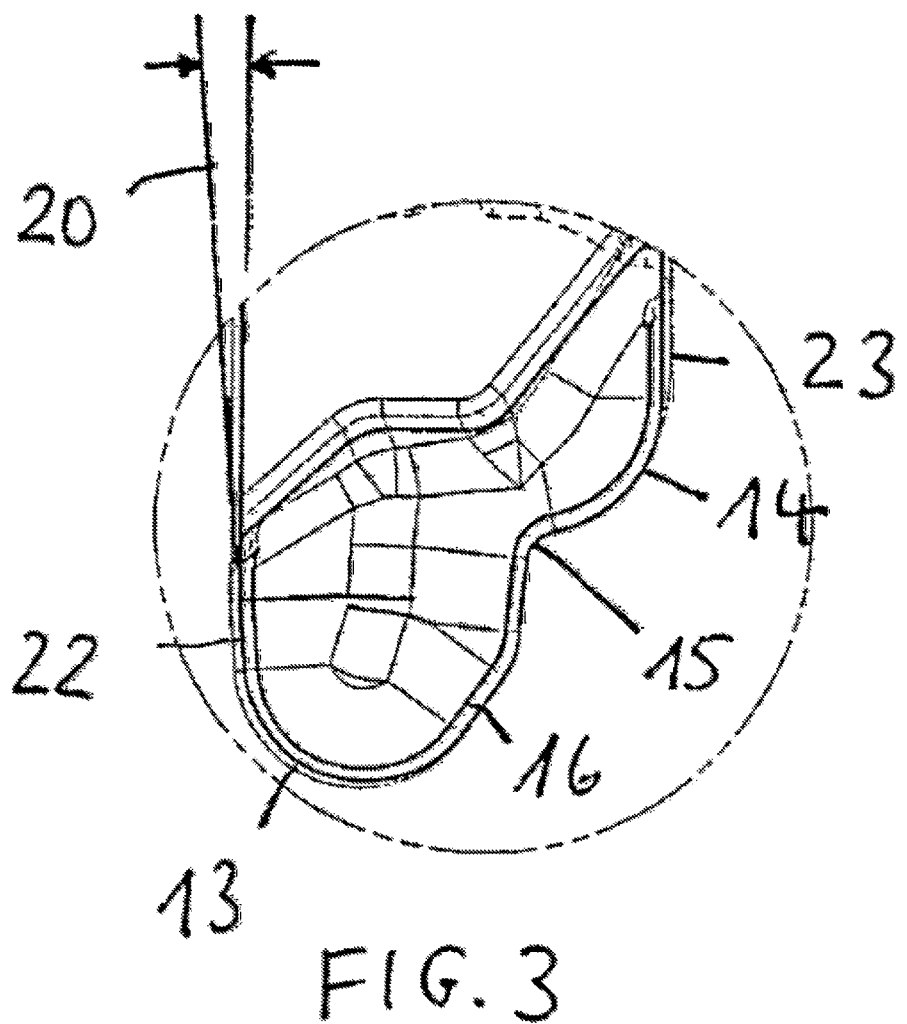
FIG. 3 is an enlarged view of a cutting edge.

In the specific shape depicted in the figures, a tangent 19 common to the two convex cutting edge sections 13 and 14 forms an angle of approximately 35° with end faces 10 and 11. Also visible in FIG. 3 is a tangent 20 that extends from the outgoing section of the cutting edge section 13 where it merges with the respective end face. This tangent 20 forms an angle of approximately 4° with the end face 10 or 11.

Figure 1:
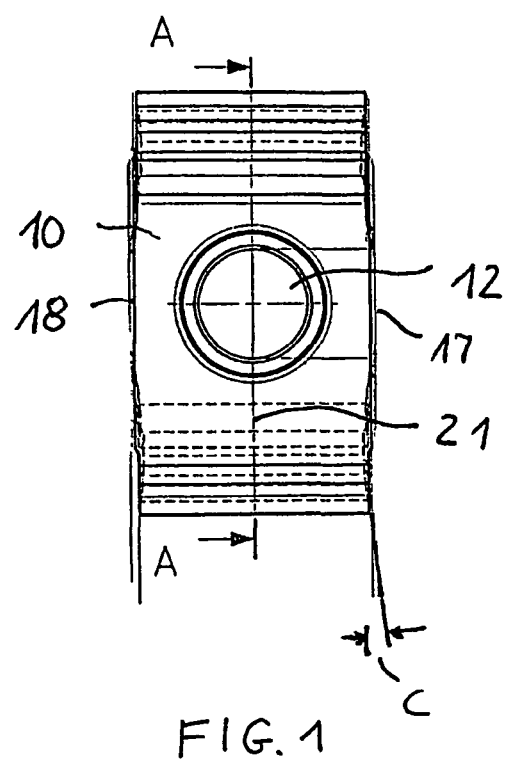
FIG. 1 is a top view of a cutting insert according to the invention.

According to the illustration of FIG. 1, cutting edges 13 to 15 are angled with respect to a longitudinal central axis 21 of the cutting insert at an angle of inclination c, preferably up to 10°.

The cutting insert has a total of four actively usable cutting edges, with which in particular stepped oil flange shapes can be machined, with either of outgoing sections 22 or 23 serving in the manufacture of the cheek contour, depending on how the cutting insert is mounted.

The prescribed cutting insert can have chip-shaping and -guiding elements in the form of depressions or bumps on the cutting surface. The cutting insert consists of a hard metal or cermet material that can also be coated, if necessary. Typical coating materials are carbides, nitrides, oxides of the IVa to VIa metals and aluminum oxide, or else diamond coatings.

The invention claimed is:

1. A cutting insert comprising a first planar end face, an opposing second planar end face parallel to the first planar end face, a bore traversing the first and second planar end faces, a first planar side face perpendicular to the first planar end face, an opposing second planar side face perpendicular to the second planar end face, wherein each end of the first and second planar side faces terminates at a first convex cutting edge section, a second convex cutting edge section and a concave cutting edge section, wherein the first convex cutting edge section includes an outgoing section, and wherein a first tangential line extending from where the outgoing section merges with the second plan end face form a position angle with respect to the second planar face, wherein the position angle is 4 degrees, and wherein a second tangential line common to the first convex cutting edge section and the second convex cutting edge section forms an angle with respect to the first and second planar end faces, and wherein a surface of the first convex cutting edge section, the second convex cutting edge section and the concave cutting edge section is recessed away from its respective cutting edge at an angle of inclination, c, with respect to a central, longitudinal axis of the cutting insert.

2. The cutting insert according to claim 1, wherein the first convex cutting edge section is formed with a first radii, the second convex cutting edge section is formed with a second radii, and the concave cutting edge section is formed with a third radii.

3. The cutting insert according to claim 2, wherein the first, second and third radii are different from each other.

4. The cutting insert according to claim 1, wherein the first convex cutting edge section has a central angle of greater than 90 degrees.

5. The cutting insert according to claim 1, wherein the second convex cutting edge section includes a second outgoing section.

6. The cutting insert according to claim 1, further comprising a bevel extending along the first convex cutting edge section, the second convex cutting edge section and the concave cutting edge section.

7. The cutting insert according to claim 1, wherein the angle is 35 degrees.

8. A cutting insert comprising a first planar end face, an opposing second planar end face parallel to the first planar end face, a bore traversing the first and second planar end faces, a first planar side face perpendicular to the first planar end face, an opposing second planar side face perpendicular to the second planar end face, wherein each end of the first and second planar side faces terminates at a first convex cutting edge section, a second convex cutting edge section and a concave cutting edge section, wherein the first convex cutting edge section includes an outgoing section, and wherein the first convex cutting edge section has a central angle of greater than 90 degrees, and wherein a first tangential line extending from the outgoing section of the first edge section where the outgoing section merges with the second planar end face forms a positive angle with respect to the second planar end face, wherein the positive angle is 4 degrees, and wherein a second tangential line common to the first convex cutting edge section and the second convex cutting edge section forms an angle with respect to the first and second planar end faces, and wherein a surface of the first convex cutting edge section, the second convex cutting edge section and the concave cutting edge section is recessed away from its respective cutting edge at an angle of inclination, c, with respect to a central, longitudinal axis of the cutting insert.

9. The cutting insert according to claim 8, wherein the first convex cutting edge section is formed with a first radii, the second convex cutting edge section is formed with a second radii, and the concave cutting edge section is formed with a third radii.

10. The cutting insert according to claim 9, wherein the first, second and third radii are different from each other.

11. The cutting insert according to claim 8, wherein the angle of inclination is less than or equal to 10 degrees.

12. The cutting insert according to claim 8, further comprising a bevel extending along the first convex cutting edge section, the second convex cutting edge section and the concave cutting edge section.

13. The cutting insert according to claim 8, wherein the angle is 35 degrees.

* * * * *